United States Patent Office 3,823,027
Patented July 9, 1974

3,823,027
METHOD OF FORMING OPAQUE FILMS
Marco Wismer, Gibsonia, Charles Pohan, Philadelphia, Kenneth E. Miller, Natrona Heights, and Charles M. Hansen, Glenshaw, Pa., assignors to PPG Industries, Inc., Pittsburgh, Pa.
No Drawing. Filed Dec. 4, 1972, Ser. No. 311,588
Int. Cl. B44d 1/50; C08f 3/42, 11/02
U.S. Cl. 117—93.31                                   12 Claims

ABSTRACT OF THE DISCLOSURE

A method of forming cured opaque films, with or without the use of pigments, comprises subjecting a composition comprising an actinic light sensitive material and a solvent having a specified solubility with the material and which is present in an amount of from about 10 percent to about 70 percent by weight of the composition and which has a boiling point of at least about 115° F. or higher, to actinic light to cure said materials. The resulting film contains microvoids which causes the film to be opaque.

---

This invention relates to polymeric films and methods of making said films to achieve excellent properties with a minimum of expense.

Many methods have been devised for forming polymeric films from solutions and quasi-solutions to thereby coat and/or protect a substrate. Generally speaking, most of these methods are primarily concerned with obtaining a film which is opaque.

Opaque films are conventionally prepared by adding a pigment which acts as an opacifying agent to a solution of a film forming material which would otherwise be colorless or transparent when cast in a film. The necessity for adding an opacifying agent obviously increases the cost of the resultant film. Moreover, such films have no more porosity than the non-pigmented film.

Optical opacity, for example hiding in a paint film, is achieved either by absorption of the incident light or by scattering of the incident light, or a combination of these two. Thus, black is opaque because it absorbs the light incident on it and white is opaque because it back scatters the incident light. Light is either absorbed or scattered before it can reach the substrate. The ideal white pigment then is one which has zero absorption and maximum scattering.

Absorption depends primarily on the electronic structure of the molecule, as well as on the pigment particle size relative to the wave length of light. Scattering depends on the relative refractive indices of pigment and vehicle as well as on the particle size of the pigment relative to the wave length of incident light.

One simple description of the relation of the scattering and absorption to the resulting reflectance is that of Kubelka and Munk. At complete hiding, the following equation applies:

$$\frac{(1-R_\infty)^2}{2R_\infty} = \frac{K}{S} \quad \text{(Equation 1)}$$

where R is reflectance of a film so thick that a further increase in thickness does not change the reflectance, K is the absorption coefficient and S is the Kubelka-Munk scattering coefficient. No account is taken of the surface reflectances, and the equation applies only to internal reflectance.

The fractions contributed by more than one pigment in a system are additive as shown by the following equation:

$$\frac{(1-R_\infty)^2}{2R_\infty} = \frac{C_1 K_1 + C_2 K_2 + C_3 K_3 \ldots}{C_1 S_1 + C_2 S_2 + C_3 S_3 \ldots}$$

(Equation 2)

where $C_1$, $C_2$ and $C_3$ refer to the concentrations of pigments 1, 2, 3 etc.

When hiding is incomplete, the following equation applies:

$$R = \frac{1 - Rg(a - b \text{ ctgh } bSX)}{a - Rg + b \text{ ctgh } bSX}$$

(Equation 3)

where R is the resulting internal reflectance, Rg is the reflectance of the substrate, $a$ is equal to $(S+K)/S$, $b = (a^2-1)^{1/2}$, S is the scattering coefficient, X is the thickness of the film in mils, and ctgh refers to hyperbolic cotangent.

The Kubelka-Munk scattering coefficient may be computed from the following equation:

$$SX = \frac{1}{b} Ar \text{ ctgh } \frac{1 - aRo}{bRo} \quad \text{(Equation 4)}$$

where Ar ctgh refers to the inverse hyperbolic cotangent, Ro is the reflectance over a black substrate of 0% reflectance, $a$ may be found from the relation, $$a = \frac{1}{2}\left[\frac{R + Ro + Rg - R}{RoRg}\right]$$

and $b$ is determined as above. In this equation, R equals reflectance over a white substrate and Rg is reflectance of the substrate which is coated; or $a$ may be found from the following equation:

$$a = \frac{1}{2}\left[\frac{1}{R_\infty} + R_\infty\right]$$

K may be found from the equation $K = S(a-1)$.

The Kubelka-Munk analysis is discussed in further detail by D. B. Judd in "Color in Business, Science and Industry," John Wiley and Sons, New York, 1952, pp. 314–338; and by D. B. Judd and G. Wyszecki in "Color in Business, Science and Industry," 2nd Edition, John Wiley and Sons, New York, 1963, pp. 387–413, the disclosures of which are incorporated herein by reference.

Various processes have been described in the art for preparing opaque films which rely for opacity upon the presence of a large number of voids in the film. Such films may be prepared by depositing a film from an emulsion, e.g., either an oil-in-water or a water-in-oil emulsion. When a water-in-oil emulsion is used—i.e., one in which minute droplets of water are dispersed in a continuous phase of a film forming material—the emulsion is deposited as a coating and the organic solvent which comprised the continuous phase of the emulsion is evaporated therefrom. This causes gelation of the film forming material and entrapment of the dispersed water droplets. The water is then evaporated leaving microscopic voids throughout the film structure.

When an oil-in-water emulsion is used, the mechanism for forming the film is similar to that described above. A film forming material is dissolved in water. Thereafter, an organic liquid which is a non-solvent for the film former and which is not miscible with water is emulsified in the aqueous phase. The emulsion is cast as a film and the water is evaporated causing the film forming material to gel and entrap minute droplets of the organic liquid. This liquid is then evaporated to cause minute voids in the film structure.

Another technique for obtaining porous, opaque, non-pigmented films is by preparing an aqueous dispersion of a film forming polymer containing a water soluble organic solvent in an amount which is insufficient to dissolve the polymer. This aqueous dispersion is then cast as a film and water is evaporated causing entrapment of minute droplets of the organic solvent in the polymer. The film is then washed to dissolve the entrapped minute droplets of solvent and the film is dried.

Still another technique for obtaining porous, opaque, nonpigmented film is set forth in U.S. Pat. No. 2,961,334. Basically, this process contemplates adding a polymeric material to a liquid solvent to thereby form either a solution or a quasi-solution (i.e., as by peptizing). To this continuous phase is added a liquid which has a higher boiling point than the liquid solvent and which is a nonsolvent for the film-forming polymeric materials. The resulting emulsion is then applied to a substrate whereupon an opaque film is formed after first evaporating the water and then the non-solvent.

Coatings manufacturers, however, have been attempting to find a process which would produce an economical, opaque film having excellent properties by a speedy process.

Although the ultraviolet light cure process has been a successful, economical method of curing clear coating compositions, in order to obtain an opaque ultraviolet light cured film one must insert opaque pigments into said film. The presence of said pigments, however, absorb the ultraviolet light and prohibit a satisfactory cure of the material.

It has now been found that a strong, opaque film may be prepared, without using pigments, by a speedy process comprising subjecting one or more actinic light sensitive monomers or prepolymers and a solvent for said monomers or prepolymers to actinic light to cure said monomers or prepolymers wherein said solvents have a solubility with the monomers or prepolymers in the Hansen solubility parameter system sphere, such that the ratio of the distance of the point of the solvent from the center of the sphere to the radius of the sphere is from about 0.7:1 to about 1.2:1 and the solvent is present in an amount of from about 10 percent to about 70 percent by weight of the composition and has a boiling point of at least about 115° F. or higher and a flash point of about 50° F. or higher. The resulting film will exhibit a Kubelka-Munk scattering coefficient greater than 0.5 reciprocal mils at 4400 angstroms and greater than 0.1 reciprocal mils at 5600 angstroms.

The actinic light-sensitive monomers or prepolymers used in this invention may be any organic materials which are curable by exposure to actinic light. The most useful organic materials to be used are polyester resins and acrylic resins.

The polyester resins comprise unsaturated polyesters, solubilized in vinyl monomers. The unsaturated polyesters are ordinarily mixtures of alpha-beta ethylenically unsaturated polycarboxylic acids and polyhydric alcohols.

The ethylenically unsaturated polycarboxylic acids include such acids as:

maleic acid
furmaric acid
aconitic acid
mesaconic acid
citraconic acid
itaconic acid and halo and alkyl derivatives of such acids and the like; the preferred acid being maleic acid. The anhydrides of these acids, where the anhydrides exist, are, of course, embraced under the term "acid," since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:

ethylene glycol
diethylene glycol
triethylene glycol
polyethylene glycol
propylene glycol
dipropylene glycol
polypropylene glycol
glycerol
neopentyl glycol
pentaerythritol
trimethylol propane
trimethylol ethane and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyesters. Such acids increase the length of the polyester without adding additional crosslinking sites, which is a desired feature in some polyesters. Examples of useful dicarboxylic acids which are either saturated or only aromatically unsaturated include:

succinic acid
adipic acid
suberic acid
azelaic acid
sebacic acid
isophthalic acid
terephthalic acid
tetrachlorophthalic acid and the like. As in the case of the ethylenically unsaturated acids, the anhydrides of these acids, where the anhydrides exist, are, of course, embraced in the term "acid," since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Vinyl monomers which crosslink with unsaturated polyesters to form thermosetting materials may be interpolymerized with the acrylic compounds and polyesters, if desired. Such vinyl monomers may include:

styrene
alpha-methylstyrene
divinylbenzene
diallyl phthalate
methyl acrylate
methyl methacrylate
hexyl acrylate
octyl acrylate
octyl methacrylate
diallyl itaconate
diallyl maleate and the like. The preferred vinyl monomers are liquid compounds, soluble in the polyester components. Such monomers should preferably be free of non-aromatic carbon-carbon conjugated double bonds.

The vinyl monomer as exemplified in the above list may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer.

The preferred polyester resins are those formed from polyesters of propylene glycol or neopentyl glycol as the diol and maleic acid and phthalic or isophthalic acid as the carboxylic acids with styrene or diallyl phthalate or vinyl toluene as the solubilizing monomer.

The acrylic compositions which may be used as the actinic light-sensitive materials in this invention may be esters or amides of acrylic or methacrylic acid or co-monomers of such an ester with another copolymerizable monomer. Suitable esters include those of alcohols containing 1 to 8 carbon atoms such as methyl acrylate, methyl methacrylate, ethyl acrylate, butyl methacrylate, octyl acrylate and 2-ethyl hexyl methacrylate. Suitable amides include acrylamide, methacrylamide, tertiary butyl acrylamide and primary alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, for example, itaconate esters, maleate esters and allyl compounds, alkylene dimethylates and diacrylates, such as 1, 3-butylene dimethacrylate, and the like, and triacrylates and trimethacrylates, such as trimethyl propane trimethacrylate, and the like, may also be used. The preferred acrylates are polyacrylates and methacrylates, such as di-acrylates, di-methacrylates, tri-acrylates, tri-methacrylates, and the like, such as acryloxy pivalyl acryloxy pivalate, bis(acryloxyethyl)hexahydrophthalate and its telomers, bis-(acryloxyethyl) phthalate and its telomers, and the like. Examples of these materials are found in U.S. Pat. 3,455,802 and U.S. Pat. Application 820,672, filed Apr. 30, 1969.

Other acrylic materials which may be utilized herein are prepolymers such as acrylic syrups consisting of mixtures of acrylic monomers and acrylic polymers such as acrylate and methacrylate polymers mixed with a monomer such as butyl methacrylate, methyl methacrylate, acrylic acid, ethyl acrylate, and the like, and epoxy polydiacrylates such as bisphenol A—diglycidyl ether diacrylate, neopentyl glycol diacrylate, pentaerythritol polyacrylate mixtures, and the like.

It is noted that more than one actinic light-sensitive material may be used herein. Thus mixtures of polyacrylates such as neopentyl glycol diacrylate and trimethylol propane triacrylate may be used if desired.

The solvent used with the above actinic light-sensitive materials must have a solubility with the monomers or prepolymers used such that the ratio of the distance of the point of the solvent from the center of the Hansen sphere to the radius of the sphere is from about 0.7:1 to about 1.2:1 in the Hansen solubility parameter system and the solvent must be present in an amount of from about 10 percent to about 70 percent by weight of the composition and have a boiling point of at least 115° F. and a flash point of at least 50° F.

The extent of solubility of the solvent used with the particular actinic light-sensitive monomers and prepolymers is critical to the unexpected opacity of the cured coatings of this invention. If a solvent and monomer do not have the solubility characteristics herein described, the necessary voids will not occur during the actinic light cure. Thus the solvent used must be somewhat miscible with the monomers and prepolymers but is a relatively poor solvent therefor.

The solubility relationship between the solvent used and the monomer or prepolymer used is formulated by a method described in the literature as the "Hansen System." This system is described in the *Encyclopedia of Chemical Technology*, second edition, supplemental volume, pages 889–910 and "Solubility in the Coatings Industry" Farg Och Lack, volume, 17, by Charles Hansen, pages 69–77, 1971, which are incorporated herein by reference. The Hansen system described solvents as having three solubility parameters, $\delta_D$ (energies from dispersion forces), $\delta_P$ (the permanent dipole-permanent dipole forces, and $\delta_H$ (the hydrogen bonding forces). The parameters are found by the following equations:

$$\delta_D = (\Delta E_{D/V})^{1/2}$$
$$\delta_P = (\Delta E_{P/V})^{1/2}$$
$$\delta_H = (\Delta E_{H/V})^{1/2}$$

wherein V is a molar volume and $\Delta E = \Delta E_D + \Delta E_P + E_H$ wherein $\Delta E$ (which is available in standard handbooks) is the energy of vaporization (cohesive energy and $\Delta E_H$, $\Delta E_P$ and $\Delta E_D$ are the contribution from hydrogen bonding, permanent-dipole-permanent-dipole interactions and non-polar interactions of the solvent. $\Delta E_D$ is developed through homomorph considerations by comparison with known hydrocarbon solvents (the homomorph) having a similar size and shape at the same corresponding state ($\Delta E_D$ values of these solvents are listed in many handbooks) and $\delta_P(\Delta E_P)$ is found by $$\delta_P^2 = \frac{72,108}{V^2}\left(\frac{\epsilon-1}{2\epsilon+n_D^2}\right)(n_D^2+2)\mu^2$$

where $\epsilon$, $n_D^2$ and $\mu$ are the dielectric constant, the refrac- hydroxyl group or by subtracting $\Delta E_D$ and $\Delta E_P$ and $\Delta E$. ($\delta_H$) is found by either allowing 5000 calories for each hydroxyl group or by subtracting $\Delta E_D$ and $\Delta E_P$ from $\Delta E$. (See *Journal of Paint Technology*, Hansen, volume 39, number 505, page 104, (1967). It is noted that $\delta_P$, $\delta_D$ and $\delta_H$ points on the three dimensional graph for 154 different solvents are listed in the Encyclopedia of Chemical Technology article cited above on pages 892–895, and means are suggested there to calculate these parameters for additional solvents.

A three-dimensional plot is then constructed with axis for $\delta_P$, $\delta_D$ and $\delta_H$ and each solvent occupies a point in the plot according to its three parameters. A sphere is then constructed for each monomer or prepolymer system by adding one-half gram of the solute (monomer or prepolymer) in 5 mls. of a solvent and visually determining if the solvent dissolves, swells the solute or does not affect it. If the solvent is found to dissolve the solute, the point represented by the solvent is encompassed by the sphere for the solute. Thus after several determinations for solvents having points dissimilar from one another, a figure encompassing those which dissolve the solute and those which do not may be formed. The actual three-dimensional figure for each solute is then reconstructed to an actual sphere by simply expanding $\delta_D$ unit distance to twice that of $\delta_P$ or $\delta_H$ unit distance or by a more precise method of using the computer. In the latter case the computer systematically examines the solubility data to locate the center and radius which gives the best fit for the solubility data. Thus it objectively places the sphere to encompass the good solvent points while excluding the non-solvent points with a minimum of error (non-solvents outside or good solvents inside).

The radius for the sphere is found from the solubility data and the distance from the center of the sphere to the point for each solvent is calculated. It has been found that only those solvents which, under the Hansen system, have a ratio of the distance to the point of the solvent from the center of the sphere to the distance of the radius of the sphere of between 0.7:1 and 1.2:1 will provide the unique opacity of the cured films.

The solvent used must not only have the solubility characteristics described above, but must also be present in a specific concentration range and have a minimum boiling point and flash point.

The amount of solvent present in the composition prior to cure is critical. The solvent must comprise at least about 10 percent by weight of the composition. The preferred amount of solvent is 15 percent to about 35 percent. It may be altered anywhere within the above limits depending on the volatility of the solvent and the thickness of the film and the line speed during curing.

The solvent must also have a boiling point of at least about 115° F. and a flash point of at least about 50° F. Thus the common and more volatile solvents such as toluene, acetone, hexane, and the like even when satisfying the solubility requirements have been found to be inoperable using the method of this invention as the film formed using the solvents would not contain the voids to provide the opacity necessary.

It is noted that the temperature at cure may have some bearing on the choice of solvent so long as the solvent meets all the tests outlined above. Thus if the temperature is low, solvents having flash points and boiling points closer to 50° F. and 115° F., respectively, may be preferable. It is preferred that the cure be carried out at approximately room temperature.

The film generally is preferred to have a thickness of from about 0.1 to about 10.0 mils. If the film is to be used as a coating on a substrate, it is preferred to be not greater than 5 mils.

It is noted that more than one solvent may be used with the actinic light-sensitive monomers or prepolymers as long as the mixture meets the solubility requirements and is maintained in the range required. The solvents used should be immiscible with the polymers formed at the temperature of application.

The mixture of solvent and actinic light-sensitive materials may also include other materials such as dyes, fillers, and the like. In the preferred embodiment, the materials contain photosensitizers such as benzoin, benzoin methyl ether, diphenyl disulfide, dibenzyl disulfide, benzil, and the like. Generally, the coating may comprise from about 0.1 percent by weight of the photosensitizer to about 10 percent by weight of the photosensitizer.

Some pigments may be added to the composition if desired. However, as the opacity is obtained without such pigments and the ultraviolet light curing of compositions containing certain pigments is difficult at best, it is strongly preferred that the system be essentially pigmentless, although pigments such as $TiO_2$ may be used in small amounts without drastically affecting cure, other pigments that are relatively transparent in the ultraviolet range may be used in higher concentrations such as up to about 10 percent by weight. Certain inorganic fillers and viscosity modifiers may also be incorporated in the compositions. These include various types of silica, talcs, clays and alkaline earth metals, carbonates and sulfates.

The solvent and actinic light-sensitive material are subjected to actinic light such as ultraviolet light. In general, the use of wave lengths in which sensitivity to actinic light occurs is approximately 1800 to 4000 angstrom units. Various suitable sources of the actinic light are available in the art including by way of example, quartz mercury lamps, ultraviolet cored carbon arcs, and high-flash lamps.

The amount of time that the material must be exposed to the actinic light and the intensity of the actinic light, may vary greatly with the type of material treated. The actinic light to which the material is exposed must be enough to cure the coating at least to a point where the surface layer is hard and non-tacky.

The treatment with actinic light is generally carried out in an inert atmosphere containing less than about 150 parts per million of oxygen. The most readily available gaseous atmospheres are nitrogen gas, helium gas, and the like.

The speed at which the composition passes through the actinic light unit may vary. Generally, it is preferred that line speeds of from about 10 to greater than 200 feet per minute may be used. The resulting film is unexpectedly opaque although no pigments have been present. This phenomenon depends on the use of the solvent-actinic light-sensitive material balance as described above.

The above method is particularly useful for coating substrates. The substrates may be coated with the composition and then subjected to actinic light to cure.

Any conventional coating method may be used such as roll coating, spraying, dip coating, and the like. A wide range of substrates may be coated such as paper, wood, glass, metals, plastics, and the like. It is preferred to use substrates which are not degradable by actinic light.

The following examples set forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLE 1

A composition comprising 10 grams of a mixture of pentaerythritol tri-acrylate and pentaerythritol tetra-acylate, 5.5 grams of butyl acrylate, 2.5 grams of Isopar M (comprising 79.4 percent paraffins, 19.6 percent naphthenes, 0.9 percent aromatics and 0.1 percent olefins) having a flash point of 172° F., a distillation range of 405–484° F. and a specific gravity of 0.782 and a trace amount of benzoin with this formula was mixed and 0.5 gram of the composition was placed in an aluminum weighing dish and exposed to a medium pressure mercury vapor lamp in an atmosphere of nitrogen for 30 seconds to cure. The cured film was white and resistant to acetone.

EXAMPLE 2

A composition comprising 50 parts of acryloxy pivalyl acryloxy pivalate

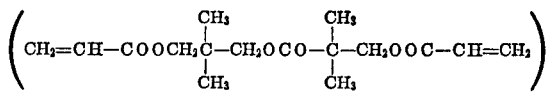

and 50 parts of naphtha mineral spirits having a boiling point of a range of 155–210° C. and a flash point of 100° F. and 1 percent by weight of Triganol 14 photosensitizer (the benzoin alkyl ether prepared from a mixture of $C_4$ and $C_5$ aliphatic alcohols) was prepared. The ratio of the distance of the point of the naphtha from the center of the Hansen sphere to the radius of the sphere was found to be .787.

The above composition was coated on to an alodine treated aluminum substrate by a drawbar to a 1 mil thickness and the coating was cured under a single bulb-high intensity mercury vapor bulb (330 watt per square inch) in a nitrogen atmosphere at a line speed of 75 feet per minute. An opaque, cured coating was obtained.

EXAMPLE 3

A coating composition comprising 50 parts of 2-ethyl hexanol having a flash point of 185° F. and a boiling point of 355° F. and 50 parts of an epoxy diacrylate (the reaction product of the diglycidyl ether of bisphenol A and acrylic acid) and 1 percent by weight of Triganol 14 was prepared.

The solubility of the 2-ethyl hexanol to the epoxy diacrylate was determined by constructing the Hansen sphere for the epoxy diacrylate and locating the point on the sphere of 2-ethyl hexanol from its coordinates $\delta_D=7.78$, $\delta_P=1.6$, $\delta_H=5.8$. Thus the sphere appears as follows:

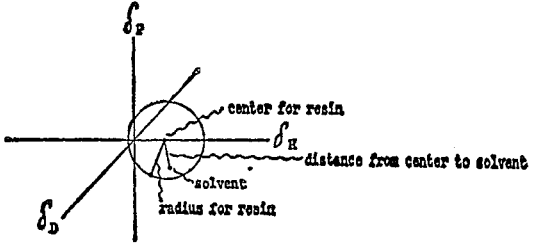

The distance from the center to the point is 6.62 and R (radius) is 7.5 and the distance/R is 0.883 which is within the solubility range required.

An alodine treated aluminum substrate was coated with the above composition to a thickness of 2 mils wet and then subjected to a single pass under a medium pressure mercury vapor lamp with 330 watts per inch output in an air containing atmosphere at a line speed of 25 feet per minute. The resulting coating was solvent resistant and opaque.

EXAMPLE 4

A composition comprising 50 parts of the diacrylate of neopentyl glycol and 50 parts of Isopar M and 1 percent by weight of Triganol 14 was formed.

The solubility of the Isopar M in diacrylate was determined by constructing the Hansen sphere for the diacrylate and locating the point on the graph of Isopar M from the coordinates $\delta_D=7.25$, $\delta_P=0$, $\delta_H=0$.

The sphere resembles that of Example 3.

The distance from the center to the point is 5.90 and the radius is 7.5 and the distance to radius ratio is 0.787.

An alodine treated aluminum substrate was coated with the above composition to a thickness of 2 mils wet and then subjected to ultraviolet light for one pass in nitrogen atmosphere at 50 feet per minute. The resulting coating was opaque and solvent resistant.

EXAMPLE 5

A composition comprising 50 parts of acryloxy pivalyl acryloxy pivalate and 50 parts of Isopar M with 1 percent by weight of Triganol 14 was formed.

The solubility of the Isopar M—acryloxy pivalyl acryloxy pivalate was determined by constructing the Hansen sphere for the diacrylate and locating the point on the graph of Isopar M from its coordinates.

The distance from the center to the point is 5.90 and the radius is 7.5 and the distance to radius ratio is 0.787.

An alodine treated aluminum substrate was coated with the above composition to a thickness of 2 mils wet and then subjected to ultraviolet light in nitrogen atmosphere for one pass at 50 feet per minute. The resulting coating was opaque and solvent resistant.

EXAMPLE 6

A composition comprising 50 parts of a polyester diacrylate prepared by esterifying the ester formed from phthalic anhydride (1 mole) and ethylene glycol (2 moles) with acrylic acid and 50 parts of solvesso 150 (an alkylated aromatic solvent) having a flash point of 152° F. and a boiling range of 369–406° F. and 1 percent Triganol 14 was formed.

The solubility of the solvesso 150-diacrylate blend was determined by constructing the Hansen sphere for the diacrylate and locating the point on the graph of solvesso 150 from its coordinates $\delta_D=8.70$, $\delta_P=0.3$ and $\delta_H=0.7$.

The distance from the center to the point is 7.15 and the radius is 7.0 and the distance to radius ratio is 1.02.

An alodine treated aluminum substrate was coated with the above composition to a thickness of 2 mils wet and then subjected to ultraviolet light for one pass at 75 feet per minute in nitrogen atmosphere. The resulting coating was opaque and solvent resistant.

EXAMPLE 7

A composition comprising 50 parts of neopentyl glycol diacrylate and 50 parts of propylene glycol with 1 percent Triganol 14 was formed.

The solubility of the propylene glycol—diacrylate blend was determined by constructing the Hansen sphere for the diacrylate and locating the point on the graph of propylene glycol from its coordinates $\delta_D=8.24$, $\delta_P=4.6$ and $\delta_H=11.4$.

The distance from the center to the point is 7.39 and the radius is 7.5 and the distance to radius ratio is 0.985.

An alodine treated aluminum substrate was coated with the above composition to a thickness of 2 mils wet and then subjected to ultraviolet light in nitrogen atmosphere for one pass at 50 feet per minute. The resulting coating was opaque and solvent resistant.

EXAMPLE 8

A composition comprising 50 parts of the diacrylate of Example 3 and 50 parts of diisobutyl ketone and 1 percent by weight of Triganol 14 was formed.

The solubility of the diisobutyl ketone-diacrylate blend was determined by constructing the Hansen sphere and locating the point on the graph of diisobutyl ketone from its coordinates $\delta_D=7.77$, $\delta_P=1.8$ and $\delta_H=2.0$.

The distance from the center to the point is 7.67 and the radius is 7.5 and the distance to radius ratio is 1.022.

An alodine treated aluminum substrate was coated with the above composition to a thickness of 2 mils wet and then subjected to ultraviolet light in air for one pass at 25 feet per minute. The resulting coating was opaque and solvent resistant.

EXAMPLE 9

A composition was formed comprising 50 parts of the diacrylate of Example 3 and 50 parts of 2-ethylhexyl acetate and 1 percent by weight of Triganol 14.

The solubility of the 2-ethylhexyl acetate-diacrylate blend was determined by constructing the Hansen sphere and locating the point on the graph of 2-ethylhexyl acetate from its coordinates $\delta_D=7.73$, $\delta_P=1.4$ and $\delta_H=2.5$.

The distance from the center to the point is 7.71 and the radius is 7.5 and the distance to radius ratio is 1.028.

An alodine treated aluminum substrate was coated with the above composition to a thickness of 2 mils wet and then subjected to ultraviolet light in air for one pass at 25 feet per minute. The resulting coating was opaque and solvent resistant.

EXAMPLE 10

A composition comprising 50 parts of the diacrylate of Example 3 and 50 parts of isobutyl isobutyrate and 1 percent Triganol 14 was formed.

The solubility of the isobutyl isobutyrate was determined by constructing the Hansen sphere and locating the point on the graph of isobutyl isobutyrate from its coordinates $\delta_D=7.73$, $\delta_P=1.4$ and $\delta_H=2.5$.

The distance from the center to the point is 7.71 and the radius is 7.5 and the distance to radius ratio is 1.028.

An alodine treated aluminium substrate was coated with the above composition to a thickness of 2 mils wet and then subjected to ultraviolet light in air atmosphere for one pass at 25 feet per minute. The resulting coating was opaque and solvent resistant.

EXAMPLE 11

A composition comprising 50 parts of the diacrylate of Example 3 and 50 parts of methyl heptyl ketone and 1 percent Triganol 14 was formed.

The solubility of the methyl heptyl ketone/diacrylate blend was determined by constructing the Hansen sphere and locating the point on the graph of methyl heptyl ketone from its coordinates $\delta_D=7.9$, $\delta_P=2.2$ and $\delta_H=1.8$.

The distance from the center to the point is 7.4 and the radius is 7.5 and the distance to radius ratio is 0.987.

An alodine treated aluminum substrate was coated with the above composition to a thickness of 2 mils wet and then subjected to ultraviolet light in air for one pass at 25 feet per minute. The resulting coating was opaque and solvent resistant.

EXAMPLE 12

A composition comprising 50 parts of neopentyl glycol diacrylate and 50 parts of propylene glycol and 1 percent Triganol 14 was mixed in a 1:1 pigment binder ratio with lithapone pigment and coated on an alodine treated aluminum substrate and subjected to ultraviolet light to cure. The resulting film was hard and opaque.

EXAMPLE 13

A composition comprising 45 parts of the diacrylate of Example 3, 5 parts of hydroxy ethyl acrylate monomer and 50 parts of 2-ethyl hexanol with 1 percent Triganol 14 was coated on an alodine treated aluminum substrate and subjected to ultraviolet light to cure.

The resulting film was stain resistant and opaque.

According to the provisions of the patent statutes, there is described above the invention and what are now considered to be its best embodiments. However, within the scope of the appended claims, it is to be understood that the invention can be practiced otherwise than as specifically described.

What is claimed is:

1. The method of forming opaque films comprising subjecting a composition comprising one or more actinic light-sensitive monomers or prepolymers and a solvent for said monomer or prepolymer to actinic light to cure said monomers or prepolymers wherein said solvent has a solubility in the Hansen solubility parameter system sphere with the monomer or prepolymer such that the ratio of the distance of the point of the solvent from the center of the sphere to the radius of the sphere is from about 0.7:1 to about 1.2:1 and the said solvent, having a boiling point of at least about 115° F. and a flash point of at least about 50° F., is present in the composition prior to cure in an amount of from about 10 percent to about 70 percent by weight of the composition.

2. The method of Claim 1 wherein the actinic light-sensitive monomer is a diacrylate monomer.

3. The method of Claim 1 wherein the actinic light-sensitive prepolymer is a polyester resin.

4. The method of Claim 1 wherein the solvent is a non-solvent for the polymer formed by said curing.

5. The method of Claim 1 wherein the composition also contains pigments.

6. The method of Claim 1 wherein the composition also contains photosensitizers.

7. The method of coating a substrate with an opaque film comprising applying a composition comprising one or more actinic light-sensitive monomers and a solvent for said monomer to the substrate and subjecting the coated substrate to actinic light to cure said monomers wherein said solvent has a solubility in the Hansen solubility parameter system sphere with the monomer or prepoylmer such that the ratio of the distance of the point of the solvent from the center of the sphere to the radius of the sphere is from about 0.7:1 to about 1.2:1 and the said solvent, having a boiling point of at least 115° F. and a flash point of at least 50° F., comprises from about 10 percent to about 70 perecnt by weight of the composition prior to cure.

8. The method of Claim 7 wherein the actinic light-sensitive monomer is a diacrylate monomer.

9. The method of Claim 7 wherein the actinic light-sensitive prepolymer is a polyester resin.

10. The method of Claim 7 wherein the solvent is a non-solvent for the polymer formed by said curing.

11. The method of Claim 7 wherein the composition also contains pigments.

12. The method of Claim 7 wherein the composition also contains photosensitizers.

References Cited

UNITED STATES PATENTS

| | | | |
|---|---|---|---|
| 3,486,946 | 12/1969 | Duddy | 264—53 |
| 3,544,489 | 12/1970 | Dowbenko et al. | 260—2.5 M |
| 3,594,220 | 7/1971 | Schwacke et al. | 260—2.5 AY |
| 3,607,692 | 9/1971 | Sanner et al. | 117—93.31 |
| 3,654,193 | 4/1972 | Seiner | 260—2.5 M |
| 3,661,807 | 5/1972 | Seiner | 260—2.5 M |

OTHER REFERENCES

Kirk-Othmer *Encyclopedia of Chemical Technology*, Second Edition,, Supplement Volume, pp. 896–902 (1971).

WILLIAM D. MARTIN, Primary Examiner

J. H. NEWSOME, Assistant Examiner

U.S. Cl. X.R.

117—135.5, 161 UC, 161 K; 204—159.16, 159.22; 260—2.5 M, 32.8 R, 33.6 UA, 33.4 R; 264—53, 204